(12) United States Patent
Makino (10) Patent No.: US 7,117,011 B2
(45) Date of Patent: Oct. 3, 2006

(54) CAMERA-EQUIPPED CELLULAR PHONE

(75) Inventor: Masami Makino, Gifu (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 194 days.

(21) Appl. No.: 10/508,018

(22) PCT Filed: Jan. 27, 2003

(86) PCT No.: PCT/JP03/00744

§ 371 (c)(1),
(2), (4) Date: Sep. 24, 2004

(87) PCT Pub. No.: WO03/081901

PCT Pub. Date: Oct. 2, 2003

(65) Prior Publication Data

US 2005/0107117 A1    May 19, 2005

(30) Foreign Application Priority Data

Mar. 27, 2002 (JP) .............................. 2002-089710

(51) Int. Cl.
*H04M 1/00* (2006.01)

(52) U.S. Cl. ............... 455/556.1; 455/566; 455/556.2; 455/575.1; 455/575.3; 348/370; 348/371; 348/333.01; 348/335; 348/340

(58) Field of Classification Search ......... 455/566, 455/556.1, 556.2, 575.1, 575.3; 348/370, 348/371, 333.01, 335, 340
See application file for complete search history.

(56) References Cited

U.S. PATENT DOCUMENTS

2004/0204060 A1* 10/2004 Makinouchi et al. .... 455/556.1
2005/0085263 A1* 4/2005 Kim et al. ................ 455/556.1
2005/0130702 A1* 6/2005 Saburi et al. ............ 455/556.1
2005/0130720 A1* 6/2005 Finke-Anlauff .......... 455/575.3
2005/0245288 A1* 11/2005 Priestman et al. ....... 455/569.1

FOREIGN PATENT DOCUMENTS

| JP | 10-142656 | 5/1998 |
|---|---|---|
| JP | 2001-320461 | 11/2001 |
| JP | 2001-320622 | 11/2001 |
| JP | 2002-107805 | 4/2002 |
| JP | 2003-43557 | 2/2003 |

* cited by examiner

*Primary Examiner*—Matthew D. Anderson
*Assistant Examiner*—Tuan Pham
(74) *Attorney, Agent, or Firm*—Armstrong, Kratz, Quintos, Hanson & Brooks, LLP

(57) ABSTRACT

The present invention provides a portable telephone with camera including a casing provided with an auxiliary light window 23 adjacent to a camera window 22, and an auxiliary light source 8 disposed in the rear of the auxiliary light window 23 and emitting light in photographing with a camera 7. A main optical cover 4 is mounted on the casing for covering the camera window 22 and the auxiliary light window 23. The main optical cover 4 has an opening 43 formed at a position opposed to the auxiliary light window 23. An auxiliary optical cover 5 is fitted around the opening 43. A flange 53 projects from an outer periphery portion of the auxiliary optical cover 5. The flange 53 is held between a flange portion 25 surrounding the auxiliary light window 23 and formed on the casing, and an edge portion 43a defining the opening 43 and formed on the main optical cover 4.

2 Claims, 6 Drawing Sheets

CAMERA-EQUIPPED CELLULAR PHONE

TECHINICAL FIELD

The present invention relates to portable telephones integrally equipped with a camera to allow the user to take a picture.

BACKGROUND ART

Figure 9:
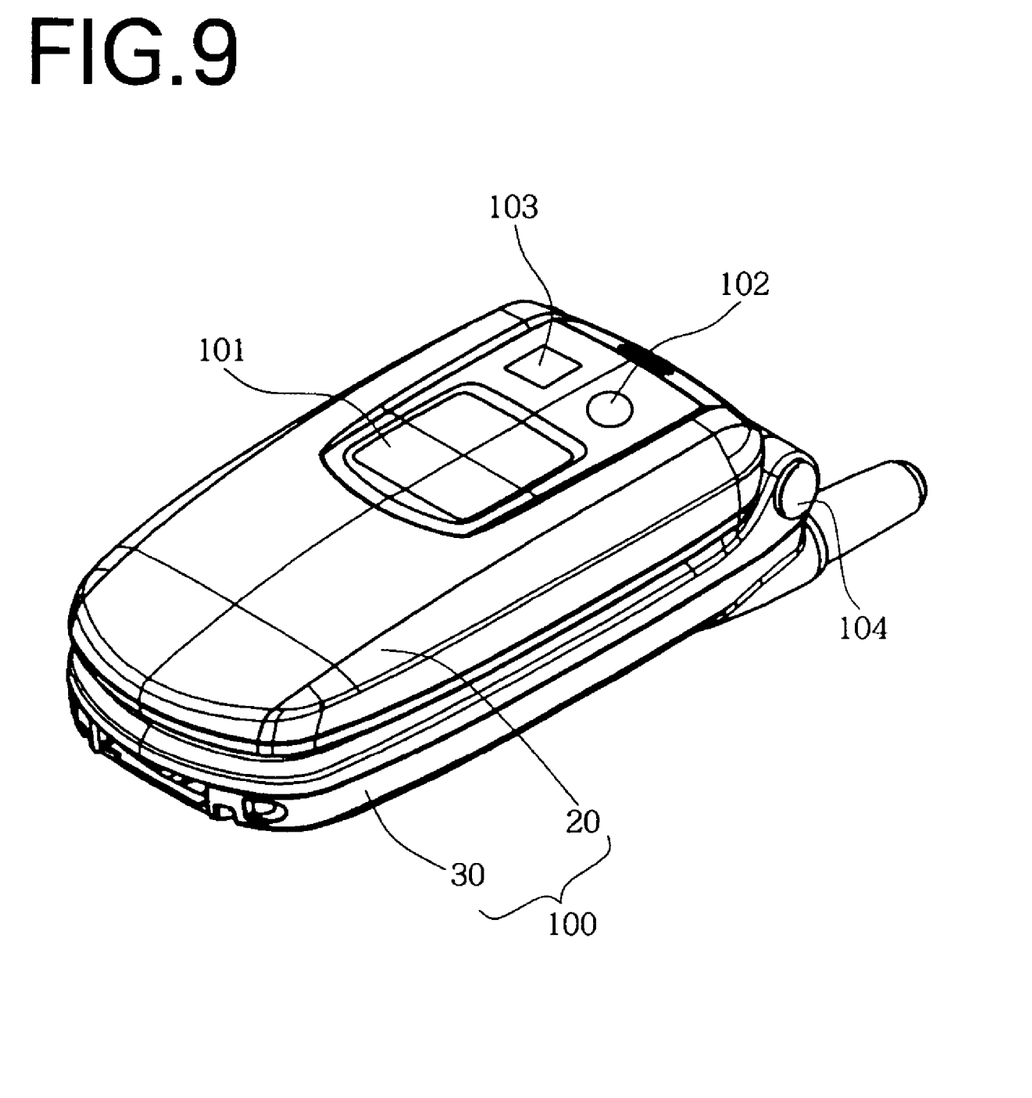
FIG. 9 is a perspective view of the conventional portable telephone with camera.

In recent years portable telephones with camera have been in wide use. For example, a portable telephone with camera shown in FIG. 9 comprises an upper half case 20 and lower half case 30 which are connected by a hinge mechanism 104 to provide a foldable portable telephone. An auxiliary display 101 and a camera window 102 are disposed on an outer surface of the upper half case 20. A CCD camera (not shown) is provided in the rear of the camera window 102. Furthermore, arranged in a side portion of the camera window 102 on an outer surface of the upper half case 20 is a mirror member 103 for projecting the user's self image thereon to thereby adjust the direction of the camera when the user is to photograph the user's self image.

However, the conventional portable telephone with camera has the problem that when a picture is taken with the CCD camera in the dim light, natural light does not provide sufficient brightness to make the taken image unclear. An auxiliary light source is arranged on the portable telephone with camera for making up for the brightness in photographing.

The portable telephones have become increasingly made compact. When such a compact portable telephone has arranged thereon the CCD camera and the auxiliary light source, the CCD camera and the auxiliary light source need to be mounted in the close proximity. Accordingly it is necessary to provide a main optical cover for covering the CCD camera and an auxiliary optical cover for covering the auxiliary light source which are in contact with one another. In this case the main optical cover and the auxiliary optical cover need to be mounted on the casing in a compact structure and with a sufficient strength. Furthermore it is necessary that the two optical covers be mounted on the casing with ease.

An object of the present invention is to provide a portable telephone with camera wherein the main optical cover and the auxiliary optical cover are mountable on the casing in a compact structure and with a sufficient strength, and the two optical covers are further mountable on the casing with ease.

DISCLOSURE OF THE INVENTION

The present invention provides a portable telephone with camera including a casing 1 provided with an auxiliary light window 23 adjacent to a camera window 22, and an auxiliary light source 8 disposed in the rear of the auxiliary light window 23 and emitting light in photographing with a camera 7. A main optical cover 4 is mounted on the casing 1 for covering the camera window 22 and the auxiliary light window 23. The main optical cover 4 has an opening 43 formed at a position opposed to the auxiliary light window 23. An auxiliary optical cover 5 is fitted around the opening 43.

A flange 53 projects from an outer periphery portion of the auxiliary optical cover 5. A flange portion 25 surrounding the auxiliary light window 23 is formed on the casing 1. An edge portion 43a defining the opening 43 is formed on the main optical cover 4. The flange 53 of the auxiliary optical cover 5 is held between the flange portion 25 of the casing 1 and the edge portion 43a of the main optical cover 4.

With the portable telephone with camera of the present invention, the main optical cover 4 is mounted on the casing 1, and the auxiliary optical cover 5 is further mounted on the main optical cover 4. Therefore the telephone has more simple structure and is made more compact than that wherein the main optical cover 4 and the auxiliary optical cover 5 are separately mounted on the casing 1.

The auxiliary optical cover 5 has the flange 53 projecting from the outer periphery and which is held between the flange portion 25 of the casing 1 and the edge portion 43a of the main optical cover 4, so that when a great depressing force is applied to the auxiliary optical cover 5, the auxiliary optical cover 5 is received by the flange portion 25 of the casing 1. Accordingly the auxiliary optical cover 5 will never be removed from the main optical cover 4.

The auxiliary optical cover 5 is mounted on the main optical cover 4 to provide one integrated optical cover, and thereafter the one integrated optical cover is mounted on the casing 1, whereby the assemble step is made easy.

Stated specifically, an adhesive layer is interposed between opposed faces of the flange 53 of the auxiliary optical cover 5 and the edge portion 43a of the main optical cover 4. An adhesive layer is also interposed between opposed faces of the flange 53 of the auxiliary optical cover 5 and the flange portion 25 of the casing 1. Accordingly the auxiliary optical cover 5 is secured to the casing 1 and the main optical cover 4. According to the specific construction, adhesive layers are respectively interposed between opposed faces of the flange 53 of the auxiliary optical cover 5 and the edge portion 43a of the main optical cover 4, and between opposed faces of the flange 53 of the auxiliary optical cover 5 and the flange portion 25 of the casing 1, to thereby provide a high level of waterproof and dustproof protection between the main optical cover 4 and the auxiliary optical cover 5.

As described above, the present invention provides a portable telephone with camera wherein the main optical cover and the auxiliary optical cover are mountable on the casing in a compact structure and with a sufficient strength, and the two optical covers are further mountable on the casing with ease.

BEST MODE FOR CARRYING OUT THE INVENTION

Figure 1:
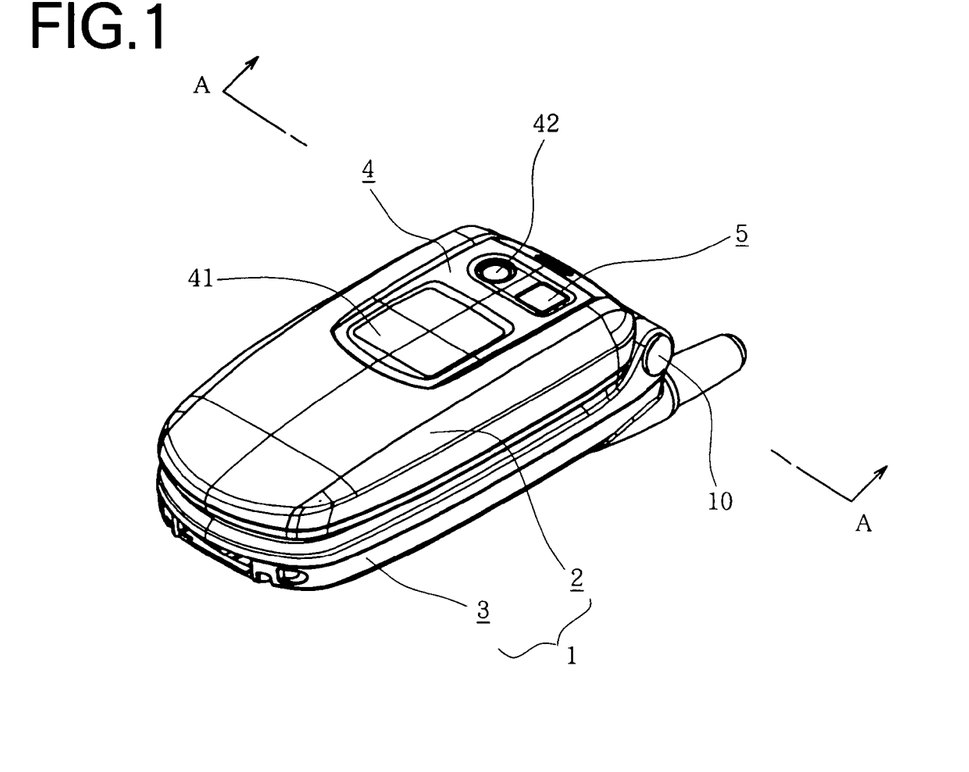
FIG. 1 is a perspective view of a portable telephone embodying the present invention.
Figure 2:
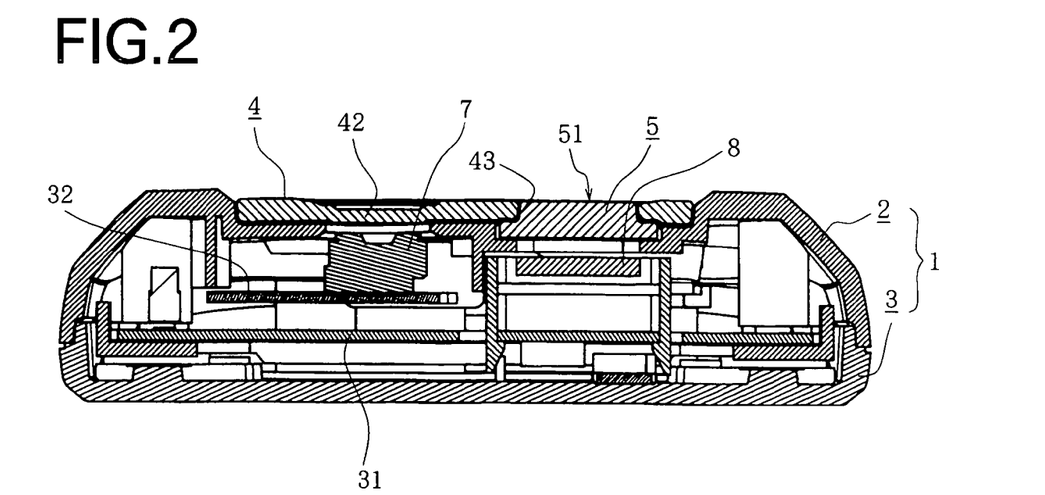
FIG. 2 is an enlarged view in section taken along the line A—A of the portable telephone.

The embodiment of the present invention will be described below in detail with reference to the drawings. The portable telephone with camera of the present invention comprises an upper half case 2 and lower half case 3 which are connected by a hinge mechanism 10 to provide a foldable portable telephone as shown in FIG. 1. A main board 31 and sub-board 32 are installed inside a casing 1 as shown in FIG. 2.

Figure 4:
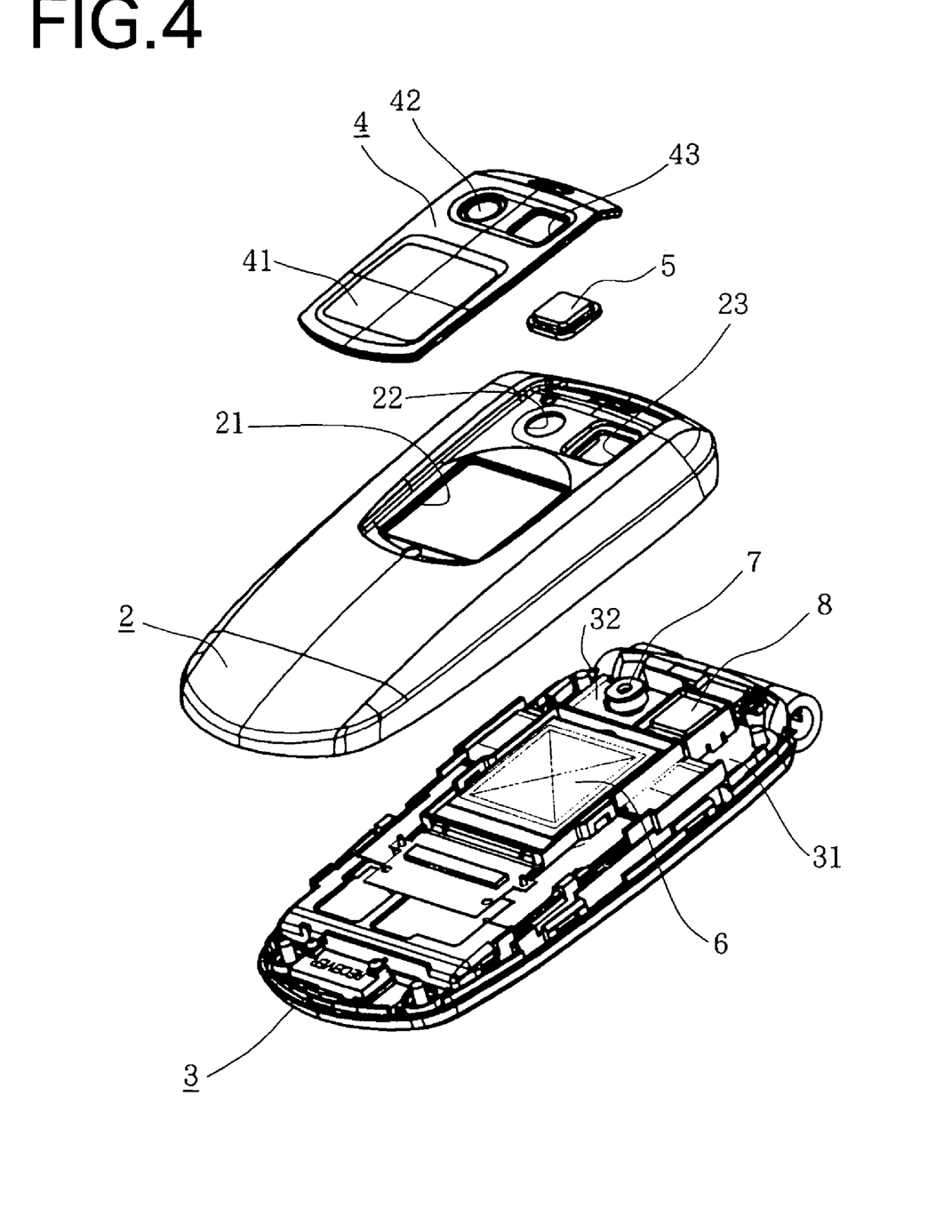
FIG. 4 is an exploded perspective view of the portable telephone.

Mounted on the main board 31 is a liquid crystal display 6 serving as an auxiliary display as shown in FIG. 4. Mounted on the sub-board 32 are a CCD camera 7 and an auxiliary light source 8 comprising LED. Provided on the upper half case 2 are a display window 21 for exposing the liquid crystal display 6, a camera window 22 for exposing the CCD camera 7, and an auxiliary light window 23 for exposing the auxiliary light source 8.

Mounted on the upper half case 2 are a main optical cover 4 for closing the display window 21 and the camera window 22, and an auxiliary optical cover 5 for closing the camera window 22. The main optical cover 4 is made of a transparent resin containing polycarbonate or acrylic. The main optical cover 4 is formed with a transparent display-window cover portion 41, which is opposed to the liquid crystal display 6, and is also formed with a transparent camera-window cover portion 42, which is opposed to the CCD camera 7. The remaining surface area of the main optical cover 4 is decorated with printing. Furthermore the main optical cover 4 is formed with an opening 43 which is to be fitted to the auxiliary optical cover 5.

Figure 7:
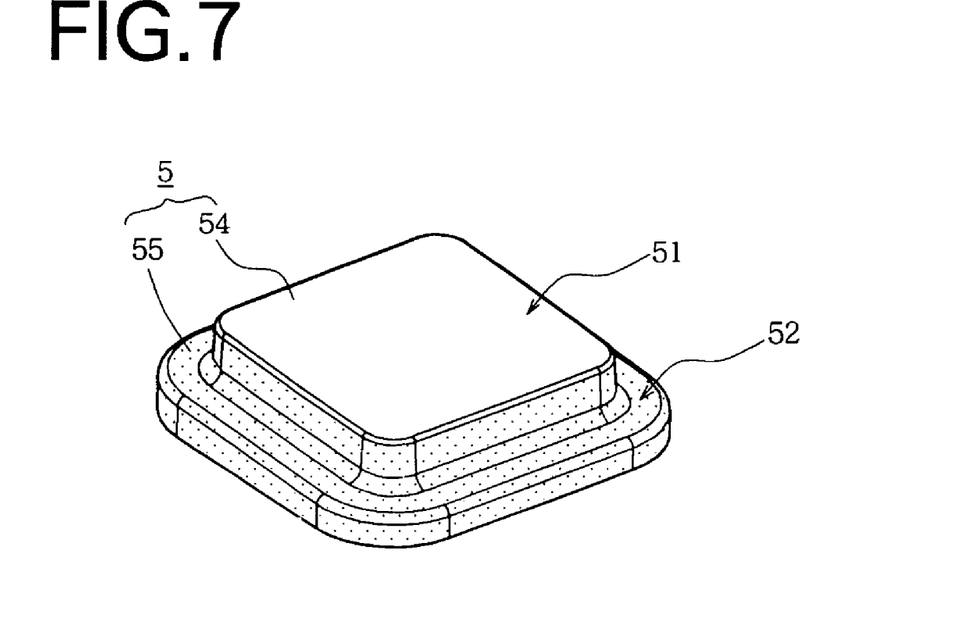
FIG. 7 is an enlarged perspective view of the auxiliary optical cover.
Figure 8:
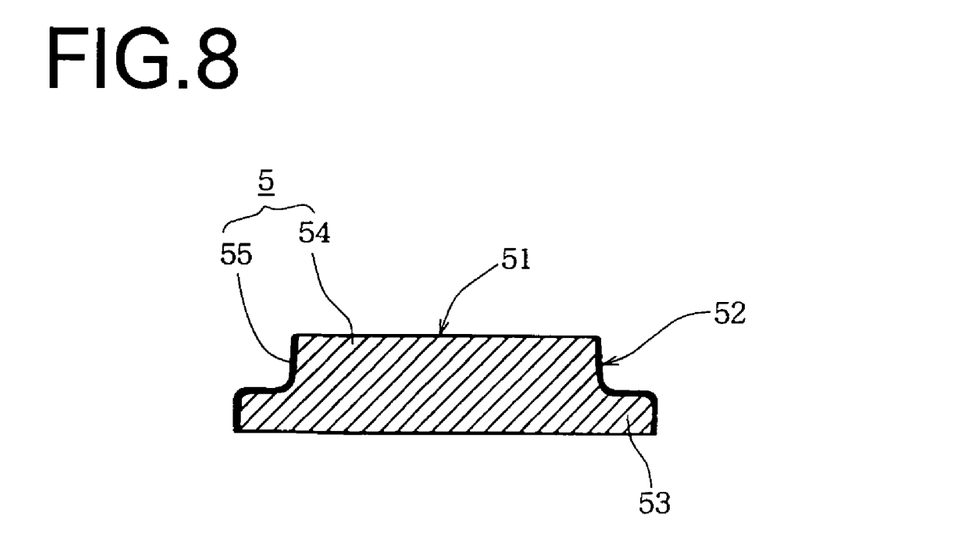
FIG. 8 is an enlarged view in section of the auxiliary optical cover.

As shown in FIGS. 7 and 8, the auxiliary optical cover 5 comprises a main body 54 having a flange 53 projecting from an outer periphery and made of transparent resin containing polycarbonate or acrylic, and an outer periphery layer portion 55 formed on the outer peripheral surface of the main body 54 and made of ABS resin. Such a two-layer structure can be easily formed by a known double injection molding. The outer peripheral portion of the auxiliary optical cover 5 is plated with nickel by electroless plating to thereby form a light-shield surface 52 which is selectively nickel-plated over the ABS resin. The light transmission rate of the light-shield surface 52 is preferably less than 10%.

The auxiliary optical cover 5 is formed with a half-mirror treated surface 51 by applying to the surface of the main body 54, aluminum, gold, silver, chromium, or titanium, etc. In this case, a visible light transmission rate of the half-mirror treated surface 51 is in the range of 10% to 90%. As the transmission rate is higher, the surface has more improved function of mirror while the attenuation rate of the auxiliary light is increased, so that the light transmission rate is suitably set depending on brightness of the auxiliary light source 8.

Figure 5:
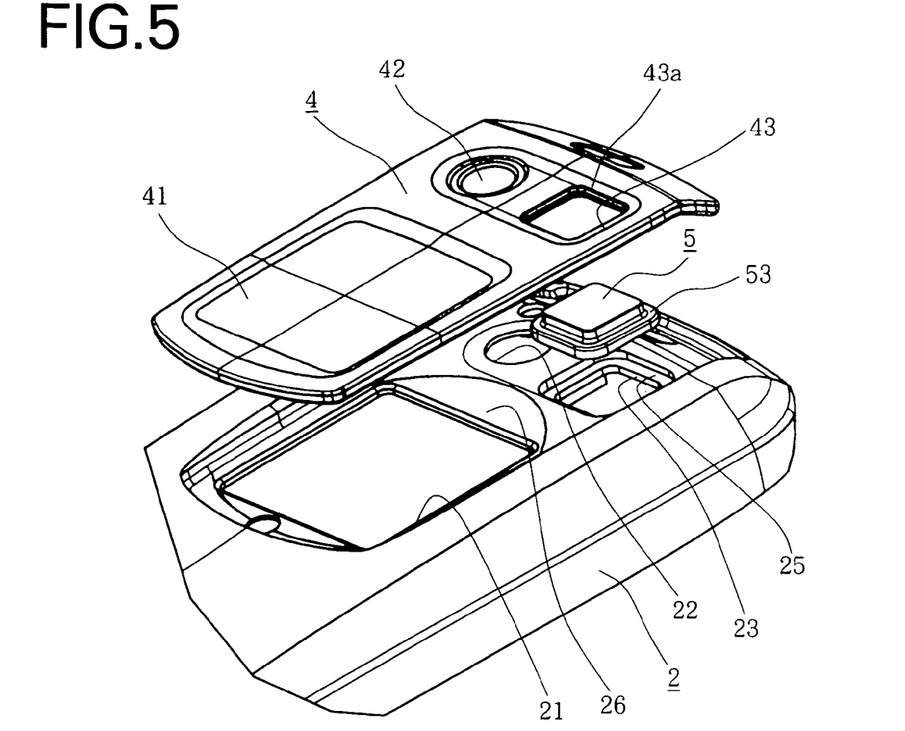
FIG. 5 is an exploded perspective view of the main assembly of the portable telephone.

The upper half case 2 is formed with a stepped wall 26 for mounting the main optical cover 4 as shown in FIG. 5. The stepped wall 26 is provided with the display window 21 and the camera window 22. A flange portion 25 projects from the stepped wall 26 for receiving the flange 53 of the auxiliary optical cover 5. The auxiliary light window 23 is provided inside the flange portion 25.

Figure 6:
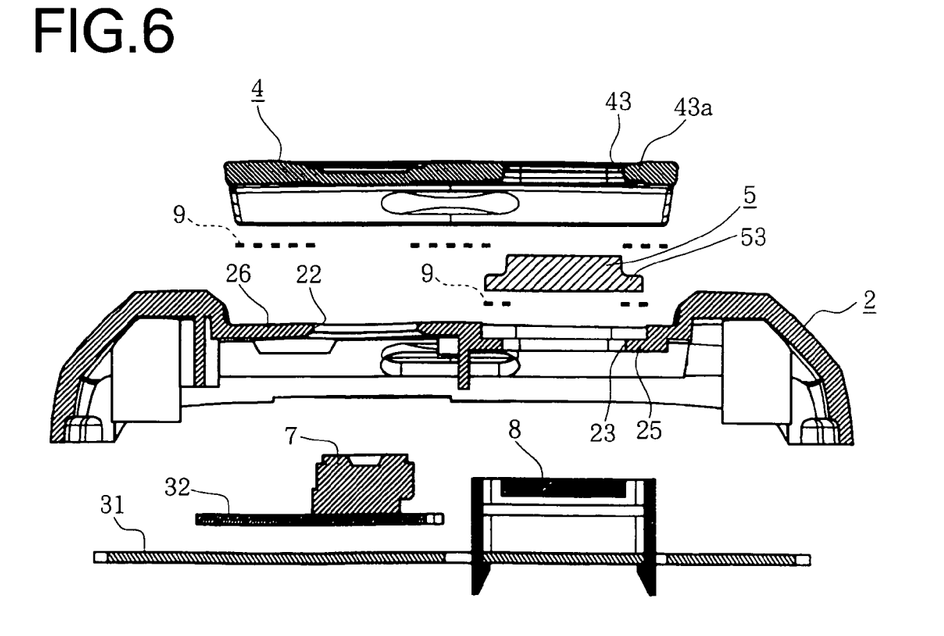
FIG. 6 is an exploded view in section of the main assembly of the portable telephone.

When the main optical cover 4 and the auxiliary optical cover 5 are to be mounted on the upper half case 2, double-faced adhesive tapes 9 are interposed, respectively, between opposed faces of the stepped wall 26 of the upper half case 2 and the main optical cover 4, between opposed faces of the flange 53 of the auxiliary optical cover 5 and the main optical cover 4, and between opposed faces of the flange 53 of the auxiliary optical cover 5 and the flange portion 25 of the upper half case 2, and the main optical cover 4 and the auxiliary optical cover 5 are then secured to the upper half case 2, as shown in FIG. 6.

In the above procedure, at first, the auxiliary optical cover 5 is mounted on the main optical cover 4 with the double-faced adhesive tape 9, and the main optical cover 4 is thereafter mounted on the upper half case 2 with the double-faced adhesive tape 9. This makes mounting process easier than that in the case where the main optical cover and the auxiliary optical cover are separately mounted on the upper half case. Therefore, the main optical cover 4 and the auxiliary optical cover 5 are integrated into one optical cover.

Figure 3:
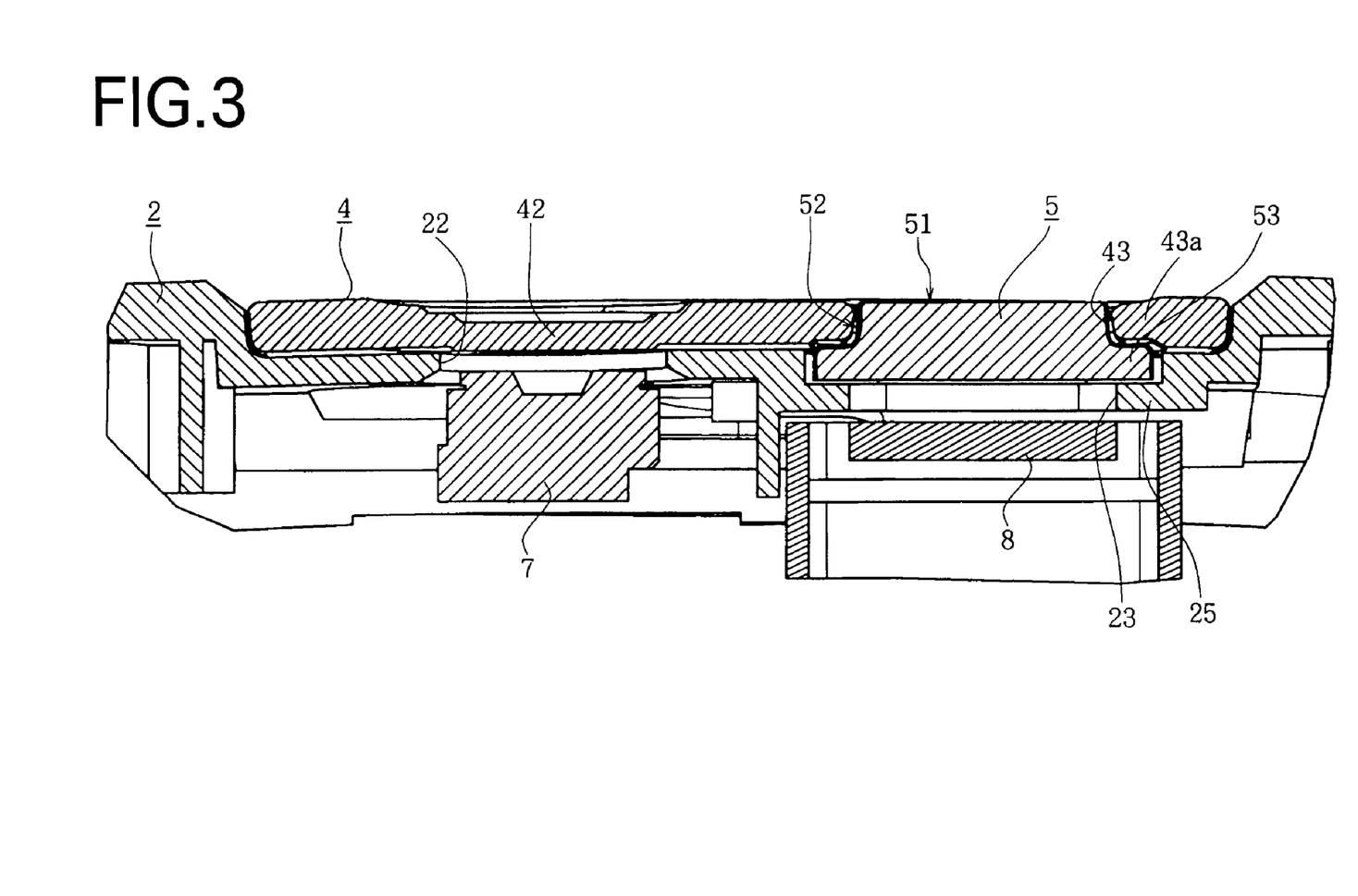
FIG. 3 is an enlarged view in section showing a main optical cover and an auxiliary light source which are mounted on an upper half case.

The flange 53 of the auxiliary optical cover 5 is held between the flange portion 25 of the upper half case 2 and an edge portion 43a defining its opening of the main optical cover 4 as seen in FIG. 3. Accordingly even if a great depressing force is applied to the auxiliary optical cover 5, the auxiliary optical cover will never fall off to the interior of the casing since the auxiliary optical cover 5 is received by the flange portion 25 of the upper half case 2.

The double-faced adhesive tape 9 is interposed, respectively, between the flange 53 of the auxiliary optical cover 5 and the edge portion 43a of the main optical cover 4, and between the flange 53 and the flange portion 25 of the upper half case 2, to thereby provide waterproof and dustproof protection completely between the main optical cover 4 and the auxiliary optical cover 5.

With the portable telephone with camera described, the CCD camera 7, which is opposed to a cover portion 42 of camera window of the main optical cover 4, can receive light passing through the cover portion 42 of camera window and impinging on the camera as shown in FIG. 2. This enables the user to photograph a subject positioned in front of the camera.

The auxiliary light source 8 is opposed to the auxiliary optical cover 5. Light emitted from the auxiliary light source 8 in large part passes through the half-mirror treated surface 51 of the auxiliary optical cover 5, so that the subject positioned in front of the camera can be illuminated by light emission of the auxiliary light source 8. In this case the light emission from the auxiliary light source 8 does not leak out from the auxiliary optical cover 5 to the main optical cover 4 because the light-shield surface 52 is formed around the outer peripheral surface of the auxiliary optical cover 5. The light emission, therefore, does not impinge on the CCD camera 7. Thus there is no likelihood that the photographed image with the CCD camera 7 has degradation of picture quality due to halation. On the other hand, light from outside impinging on the auxiliary optical cover 5 in large part is reflected on the half-mirror treated surface 51, so that the subject positioned in front of the camera is caught on the half-mirror treated surface 51.

Accordingly, when the user's self image is to be photographed with the CCD camera 7, the direction of the casing 1 is adjusted so that the user's self image can be caught on the auxiliary optical cover 5, and then the user manipulates the shutter with the self image caught on the auxiliary optical cover 5. This causes the auxiliary light source 8 to emit light, and at the same time, the CCD camera 7 performs a photographing operation, with the result that the user's self image is photographed with sufficient brightness.

With the portable telephone with camera of the present invention, the auxiliary optical cover 5 not only performs the function of a light emission window of the auxiliary light source 8, but performs the function of a mirror member wherein the subject is caught on the half-mirror treated surface 51 of the auxiliary optical cover 5, as described above. Therefore, it is not necessary to save space for providing the mirror member in addition to space for providing the auxiliary optical cover 5, whereby the casing 1 can be made compact.

Furthermore, the auxiliary optical cover 5 is fitted around the opening 43 of the main optical cover 4 to provide one optical cover, so that the CCD camera 7 can be mounted in the closest proximity to the auxiliary light source 8. Accordingly the casing 1 can be made compact.

The device of the present invention is not limited to the foregoing embodiment in construction but can be modified variously within the technical scope defined in the appended claims. For example, a camera having CMOS as an image pick-up device can be used in place of the CCD camera 7. A halogen lamp can also be used as the auxiliary light source 8 instead of LED.

The half-mirror treated surface 51 can also be formed on the rear surface of the auxiliary optical light cover 5. Instead of the metallic thin film for forming the half-mirror treated surface 51, an organic thin film can also be used. Furthermore, while the half-mirror treated surface 51 is formed on the front surface of the auxiliary optical cover 5, the rear surface is lens-surface treated to give the auxiliary lens function to the auxiliary optical cover 5.

For the light shield between the main optical cover 4 and the auxiliary optical cover 5, the light shield surface 52 need not always be formed around the outer peripheral surface of the auxiliary optical cover 5. Alternatively, an inner peripheral portion of the opening 43 of the main optical cover 4 can be given the light shield treatment.

The invention claimed is:

1. A portable telephone having a display (6) and a camera (7) mounted as opposed to a display window (21) and a camera window (22), respectively, provided on a casing (1), the portable telephone with camera being characterized in that the casing (1) is provided with an auxiliary light window (23) adjacent to the camera window (22), an auxiliary light source (8) being disposed in the rear of the auxiliary light window (23) and emitting light in photographing with the camera (7), a main optical cover (4) made of a transparent resin being mounted on the casing (1) for covering the display window (21), the camera window (22) and the auxiliary light window (23), the main optical cover (4) being formed with a transparent display window cover portion (41) and a transparent camera-window cover portion (42) opposed to the display (6) and the camera (7), respectively, and having an opening (43) formed at a position opposed to the auxiliary light window (23), an auxiliary optical cover (5) being fitted around the opening (43), a flange (53) projecting from an outer periphery portion of the auxiliary optical cover (5), a flange portion (25) surrounding the auxiliary light window (23) being formed on the casing (1), an edge portion (43a) defining the opening (43) being formed on the main optical cover (4), the flange (53) of the auxiliary optical cover (5) being held between the flange portion (25) of the casing (1) and the edge portion (43a) of the main optical cover (4).

2. A portable telephone with camera according to claim 1, wherein an adhesive layer is interposed between opposed faces of the flange (53) of the auxiliary optical cover (5) and the edge portion (43a) of the main optical cover (4), and between opposed faces of the flange (53) of the auxiliary optical cover (5) and the flange portion (25) of the casing (1), to secure the auxiliary optical cover (5) to the casing (1) and the main optical cover (4).

* * * * *

UNITED STATES PATENT AND TRADEMARK OFFICE
CERTIFICATE OF CORRECTION

| | | |
|---|---|---|
| PATENT NO. | : 7,117,011 B2 | |
| APPLICATION NO. | : 10/508018 | |
| DATED | : October 3, 2006 | |
| INVENTOR(S) | : Masami Makino | |

It is certified that error appears in the above-identified patent and that said Letters Patent is hereby corrected as shown below:

On the Title Page;
In item (54) change the title, "CAMERA EQUIPPED-CELLULAR PHONE" to be --PORTABLE TELEPHONE EQUIPPED WITH CAMERA--

Signed and Sealed this

Twenty-third Day of January, 2007

JON W. DUDAS
*Director of the United States Patent and Trademark Office*